Nov. 13, 1951     E. H. HUGENHOLTZ     2,574,482

AUTOMATIC FREQUENCY AND PHASE CONTROL SYSTEM

Filed Nov. 22, 1946     2 SHEETS—SHEET 1

INVENTOR
EDUARD HERMAN HUGENHOLTZ
BY
*Fred W. Vogel*
AGENT

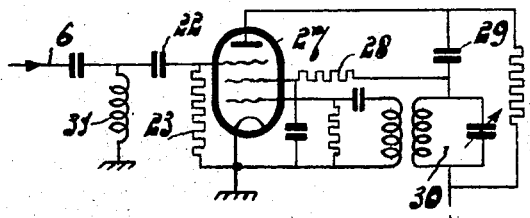
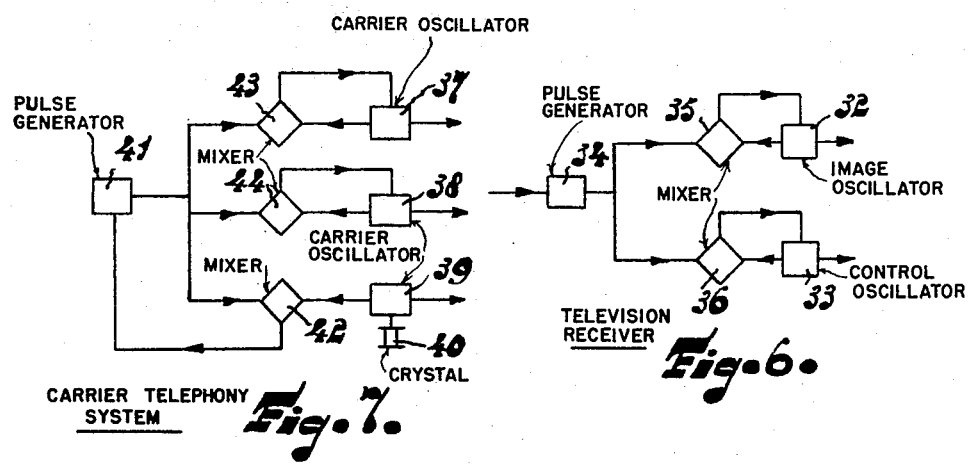
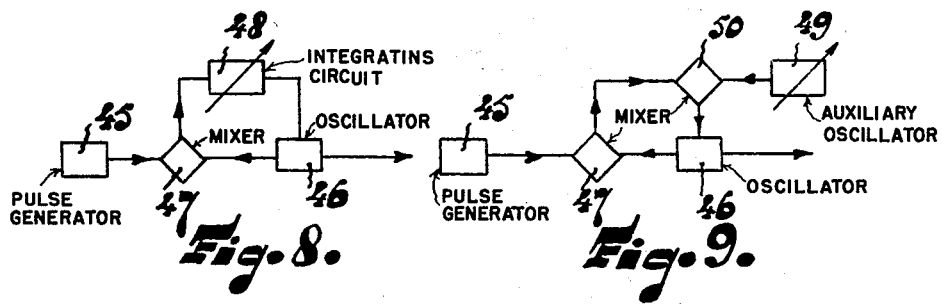
EDUARD HERMAN HUGENHOLTZ
INVENTOR

Patented Nov. 13, 1951

2,574,482

UNITED STATES PATENT OFFICE 2,574,482

AUTOMATIC FREQUENCY AND PHASE
CONTROL SYSTEM

Eduard Herman Hugenholtz, Eindhoven, Netherlands, assignor to Hartford National Bank and Trust Company, Hartford, Conn., as trustee Application November 22, 1946, Serial No. 711,506
In the Netherlands September 21, 1945

Section 1, Public Law 690, August 8, 1946
Patent expires September 21, 1965

17 Claims. (Cl. 250—36)

This invention relates to a device for deriving a control voltage from the frequency difference and/or phase difference between two alternating voltages, one of which is constituted by periodical pulses.

According to the invention the two voltages are supplied to a mixing circuit which is so designed as to be operative only for the duration of the pulses. The time constant of the output circuit of the mixing circuit preferably exceeds the time interval between the periodical pulses.

The device according to the invention is particularly adapted for controlling the frequency of one of the two alternating voltages in such manner that a harmonic frequency of the pulsatory alternating voltage and the frequency of the other alternating voltage are in synchronism, since it has been found possible to bring the oscillator which generates one of the two voltages, in accordance with the hundredth harmonic of the pulse-like voltage, which was hitherto only possible in a plurality of multiplying stages.

It is known to generate a control voltage for controlling two alternating voltages so as to be in isochronism by supplying these voltages to a mixing circuit which is so designed that, in the case of synchronism, a direct control voltage is produced, the polarity and value of which vary with the sense and value of the phase difference between the two voltages.

Such a device may, it is true, be utilized if one of the alternating voltages is constituted by periodical pulses for the purpose of obtaining synchronism or a harmonic relation between the two voltages; in this case, however, the value of the control voltage is greatly dependent on the amplitude and the duration of the pulses and on the order of the highest harmonic, with which accordance in frequency must be obtainable. As will be set out hereinafter, this is not the case in the device according to the invention.

The device according to the invention is likewise particularly adapted for maintaining a constant frequency difference between a harmonic frequency of the alternating voltage constituted by periodical pulses and the frequency of the other alternating voltage. In this case the same advantages are obtained.

The duration of the pulses of the alternating voltage constituted by periodical pulses is preferably short with respect to, or at least shorter than one cycle of the other alternating voltage.

In order that the invention may be clearly understood and readily carried into effect, it will now be described more fully with reference to the accompanying drawing.

Figs. 4 and 5 show simple forms of part of the control circuit shown in Fig. 1.

Figs. 6 and 7 illustrate some further possibilities of using the device according to the invention for synchronisation or maintaining a harmonic frequency relation, and Figs. 8 and 9 illustrate the manner in which the invention can be used for maintaining a constant frequency difference.

Figure 1:
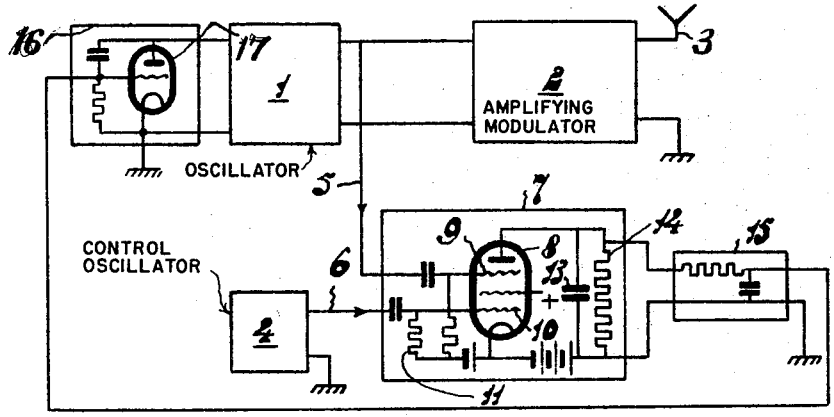
Fig. 1 shows one form of construction of a device according to the invention for stabilizing a transmitting oscillator, in which a multi-grid tube is used as a mixing stage.

Fig. 1 shows a transmitting circuit-arrangement which comprises a transmitting oscillator 1, an amplifying modulator 2, and a transmitting aerial 3. In order to stabilize the frequency of the transmitting oscillator 1, provision is made of a control oscillator 4 which generates an alternating voltage constituted by periodical pulses and having the desired frequency. The alternating voltages generated by oscillators 1 and 4 are supplied through conductors 5 and 6 respectively to a mixing circuit 7 which includes a multi-grid tube 8. This mixing circuit has the property to yield not only difference frequencies, but in the case of synchronism of the alternating voltages supplied also a direct voltage varying with the phase difference. The oscillations generated by oscillator 1 are supplied to a grid 9, the pulses generated by oscillator 4 being supplied to a grid 10. Grid 10 has such a bias voltage, by means of a resistance 11 and a condenser 12 included in the cathode lead, that tube 8 is normally blocked and that the mixing circuit is operative only for the duration of the pulses. The output circuit of tube 8 includes an integrating network consisting of a condenser 13 and a resistance 14, the time constant of which exceeds the time interval between the periodical pulses.

As long as the alternating voltages supplied differ in frequency, there is set up across the network 13, 14 an alternating voltage having the difference frequency, the amplitude of which is determined by the mean value, during the pulses, of the instantaneous amplitude of the alternating voltage supplied to grid 9. If two alternating voltages having equal frequencies are supplied to the mixing circuit 7, there is set up across the integrating network 13, 14 a direct voltage, of which the potential and value depend on the sense and value of the phase difference. The value of the direct voltage is likewise determined by the mean value, during the pulses, of the instantaneous amplitude of the alternating voltage supplied to grid 9.

If the mixing tube 8 is adjusted in such manner that it is continuously operative and that it is not made operative by the pulses only, the amplitude of the output voltage of the mixing circuit is directly proportional to the amplitude of that component of the frequency spectrum of the pulses with which the frequency of the transmitting oscillator is compared. This amplitude is proportional to the amplitude and the duration of the pulses, so that particularly in the case of transient pulses the amplitude of the frequency component concerned is small. However, the use of transient pulses is required to ensure equality of frequency with a harmonic of high order. This involves serious practical difficulties with synchronisation, for example, on the tenth harmonic of the fundamental frequency of the pulses.

On adjusting the mixing tube according to the invention, a current pulse is produced in its output circuit during each pulse of the alternating voltage supplied to grid 10, the amplitude of the said current pulse being determined by the instantaneous value of the alternating voltage supplied to grid 9. In this case the grid bias can be so adjusted that the amplitude of the current pulse concerned is independent of the value of the pulse-like voltage supplied. Due to the presence of the integrating network 13, 14 the said current pulses are converted into a voltage across condenser 13 corresponding, in the case of pulses which are transient relatively to one cycle of the alternating voltage at grid 9, with the instantaneous value of the said current pulse in the output circuit. If the duration of the pulses at grid 10 is longer, for example one quarter of the cycle, the amplitude of the voltage across condenser 13 assumes the mean value of the voltage set up at grid 9 for the duration of the pulse. Thus, if the duration of the pulses increases, the amplitude of the voltage across condenser 13 decreases, so that use is preferably made of pulses having a duration which is short relatively to one cycle of the other alternating voltage. If the duration of the pulses is equal to one cycle of the other alternating voltage, a control voltage does not ensue, since the mean value of an alternating voltage during one cycle is always equal to zero. For pulses, the duration of which lies between 1 and 2, or 2 and 3 cycles and so forth, a control voltage ensues which is maximum with a pulse the duration of which is 1.5 or 2.5 cycles and so forth. The control voltage thus produced is, however, lower than in the case of pulses which are short relatively to one cycle being used.

In the present executional example the control voltage taken from the mixing circuit is supplied to a frequency modulator 16, if necessary through a low-pass filter 15, which does not pass the fundamental frequency of the pulses. This frequency modulator is constituted by a tube 17 so backcoupled as to be wattless, so that this tube constitutes a reactance which is connected in parallel to the frequency-determining circuit of the transmitting oscillator and the value of which is adjustable by means of the control voltage.

The circuit-arrangement as described is stable, if the mixing circuit 7 has supplied to it an alternating voltage, the frequency of which corresponds with the fundamental frequency or with a harmonic of the alternating voltage constituted by pulses. In this case a phase displacement ensues between the alternating voltage supplied to grid 9 and the frequency-corresponding component of the pulse-spectrum at grid 10, which is such that a control voltage is produced which compensates, by means of the reactance tube 17, the frequency difference between the tuning frequency of the transmitting oscillator 1 and the component concerned of the pulse-like voltage. In this case a great frequency-difference may initially exist between the tuning frequency of the transmitting oscillator and the frequency component concerned of the pulse-like voltage, if only the control range of the reactance circuit 16 is sufficiently large.

If, on switching on the given device, there is a frequency difference to be readjusted which lies within the frequency range of the reactance circuit 16, the aforesaid stable condition will automatically be ensured, provided that the time constant of the control range is sufficiently small since, if the time constant of the control circuit exceeds one cycle of the frequency difference to be corrected, the voltage across the output resistance 17 of the mixing circuit and the frequency variation of the voltage of the transmitting oscillator exhibit a phase displacement to one another which is such that a continuous frequency variation of the transmitting oscillator takes place about the initial frequency.

The time constant of the control circuit and hence the maximum frequency difference corrigible may, if desired, be limited in a simple manner by the low-pass filter 15.

For those frequency differences between the voltage of the transmitting oscillator and the control voltage which exceed the limit frequency of the filter the time-constant is so great that these frequency differences cannot be corrected.

The circuit-arrangement as described thus locks the frequency of the oscillations generated by the transmitting oscillator 1, having the fundamental frequency or a harmonic frequency of the alternating voltage 4 constituted by periodical pulses, of the oscillator 4. In order to avoid ambiguity of the stable adjustment, the control range of the frequency modulator 16 or the limit frequency of the filter 15 must be smaller than the frequency distance, or half the frequency distance between two successive harmonics of the pulse-like alternating voltage.

The form of construction shown in Fig. 1 is possessed of a galvanic coupling between the anode of mixing tube 8 and the control grid of the reactance tube 17.

Figure 2:
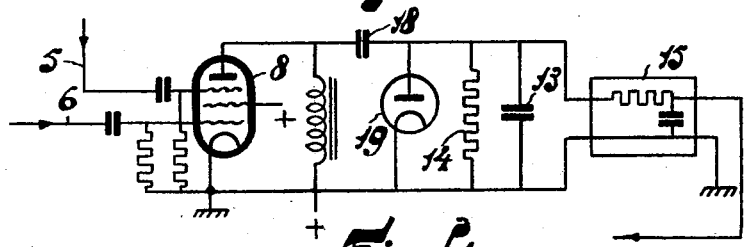
Figs. 2 and 3 show modified forms of the mixing stage.

In the form of construction shown in Fig. 2 this galvanic coupling is avoided, because the anode of the mixing tube 8 is connected, through a condenser 18, to the anode of a diode 19, which operates as a peak detector. The output circuit of the diode rectifier comprises the integrating network consisting of condenser 13 and resistance 14. This form of construction differs from that shown in Fig. 1 in that, by means of diode 19 operating as a peak-voltage detector, condenser 13 has set up at it a voltage which is not determined by the mean value, during the pulse, of the instantaneous amplitude of the other alternating voltage, but by the maximum instantaneous value, during the pulse, of the amplitude of the other alternating voltage. Consequently, the circuit arrangement is serviceable only when using pulses the duration of which is shorter than one quarter of a cycle of the non-pulsatory alternating voltage. As in the case of Fig. 1, the control voltage is supplied to the reactance circuit 16 through the low-pass filter 15.

Figure 3:
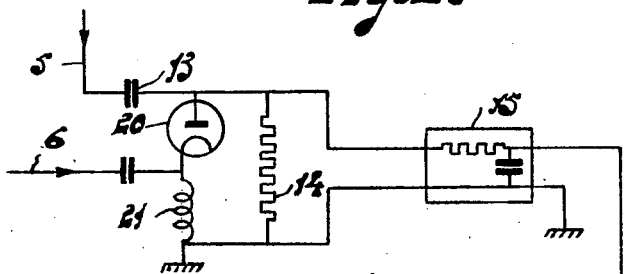

Fig. 3 shows a simplified form of the mixing circuit 7 shown in Fig. 1. In this case the alternating voltages to be mixed are made active in a diode circuit. The pulse-like voltage is supplied to a coil 21 included in the cathode lead of a diode 20, the other alternating voltage being supplied to the anode of the diode. In this case condenser 13 of the integrating network is included in conductor 5, whereas resistance 14 is connected in parallel to the series-connection of the diode and the inductance 21.

With the aforesaid choice of the time constant of the network 13, 14 the diode connection operates as a peak detector. If the amplitude of the pulses exceeds that of the other alternating voltage, diode 21 is only conductive for the duration of the pulses and condenser 13 has set up at it a control voltage, the variation of which is determined by the peak value of the other alternating voltage occurring for the duration of the pulse. This circuit-arrangement also is serviceable only when using pulses, the duration of which is shorter than one quarter of a cycle of the alternating voltage supplied through conductor 5.

Figure 4:
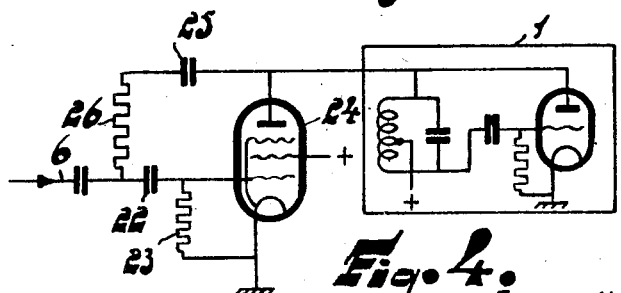

Fig. 4 shows one form of construction of part of the control circuit shown in Fig. 1. Here the pulse-like voltage is supplied to the first grid of a pentode 24 through an integrating network consisting of a condenser 22 and a resistance 23. The other alternating voltage taken from the transmitting oscillator 1 is likewise supplied to this first grid through a back-coupling circuit included between the anode and the first grid of pentode 24. The first grid and the cathode constitute a diode rectifier for the input voltages to be mixed, with the result that the control voltage is set up across resistance 23. This control voltage varies the adjustment of tube 24 and hence the apparent reactance of tube 24 which is back-coupled so as to be wattless by means of the wattless back-coupling circuit 25, 26. The tuning of the transmitting oscillator is thus controlled similarly to that of the prior forms of construction.

In the form of construction shown, by way of example, in Fig. 5 the tube, of which the wattless back-coupling is controlled, constitutes at the same time the oscillator tube for the alternating voltage to be controlled, since the screen-grid of a discharge tube 27 is connected through a resistance 28 and the anode is connected through a condenser 29 to a tuning circuit 30, which is coupled with the grid circuit. The tube 27 thus constitutes an oscillator comprising two back-coupling circuits which provide back-couplings exhibiting a phase-displacement of 90°. In this case the control of the potential of a current-dividing grid included between the screen-grid and the anode may affect the wattless component of the back-coupling and thus the oscillator frequency. Furthermore, the control grid of tube 27 forms, together with the cathode, a grid detector, to which the alternating voltage constituted by periodical pulses is supplied through a conductor 6 and to which the alternating voltage generated by the transmitting oscillator is supplied by coupling of a coil 31 included in the grid circuit with the tuning circuit 30. As in the form of construction shown in Fig. 4 provision is made of an integrating network 22, 23, owing to which there is set up at the current-dividing grid a control voltage which affects the oscillator frequency in the manner as previously described.

Fig. 6 illustrates an application of the invention for television purposes. In this case the locking of the frequency of the image and control oscillators 32 and 33 is effected by means of an alternating voltage having the mains frequency. For this purpose this alternating voltage is supplied to a pulse generator 34, the output voltage of which is supplied, jointly with the voltages originating from generators 32 and 33, to a mixing circuit 35, 36. This mixing circuit has taken from it a voltage which controls the frequency of generators 32 and 33 in the manner as already described.

Fig. 7 illustrates an application of the invention for carrier-wave telephony. In this case provision is made of a number, for example 3, of carrier-wave oscillators 37, 38 and 39, of which one oscillator 39 is stabilized in frequency by a crystal 40. Furthermore, there is a pulse generator 41, the fundamental frequency of which is brought accurately in conformity with a subharmonic of the stabilized carrier-wave oscillator 39 by means of a mixing stage 42 according to the invention. The frequencies of the oscillators 37 and 38 are, in their turn, synchronized with a harmonic of the fundamental frequency of the pulse oscillator 41 by means of mixing stages 43 and 44.

Fig. 8 shows one form of construction by which a constant frequency difference between the fundamental frequency of a harmonic of the fundamental frequency of a pulse-like voltage and the other alternating voltage can be maintained. For this purpose the voltages originating from a pulse oscillator 45 and from another oscillator 46 are supplied to a mixing circuit 47 according to the invention. In contradistinction to the forms of constructions described, in this form of construction the voltage set up across the integrating network included in the output circuit of the mixing circuit 47 is supplied to an oscillatory system, for example a filter 48, tuned to the desired difference frequency. The output voltage of the tuned system has derived from it a control voltage, of which the polarity and value vary with the sense and value of the deviation from the desired frequency difference. This control voltage corrects the tuning of the oscillator 46 until the desired frequency difference is attained. In this case the mixing circuit has taken from it, in the stable condition, an alternating voltage having the desired frequency difference, of which the amplitude, owing to the adjustment of the mixing circuit according to the invention, is dependent upon the instantaneous value of the amplitude of the controlled alternating voltage occurring for the duration of the pulses of the oscillator 45.

An improvement of the circuit-arrangement shown in Fig. 8 is represented in Fig. 9. In this case the voltage having the difference frequency, which is produced in the output circuit of the mixing circuit 47, is supplied, jointly with a voltage having the desired frequency difference which is taken from an auxiliary oscillator 49, to a mixing circuit 50, which may have taken from it a direct control voltage which serves to lock the frequency of the oscillator 46. The mixing circuit 50 is preferably a mixing circuit according to the invention; in this case the oscillator 49 must generate an alternating voltage constituted by periodical pulses, of which the fundamental frequency of a harmonic corresponds with the desired frequency difference.

In the forms of construction shown in Figs. 8 and 9, the desired frequency difference is preferably adjustable, which is effected, in the circuit-arrangement shown in Fig. 8, by adjustment of the tuning of circuit 48 and, in the circuit-arrangement shown in Fig. 9, by variation of the tuning of oscillator 49.

In the forms of construction given by way of examples the control voltage is always used for locking the frequency of the oscillator which generates the non-pulsatory alternating voltage, so that in these forms of construction frequency multiplication ensues.

If desired, the control voltage may be used for locking the frequency of the oscillator for generating the pulsatory alternating voltage; in this case frequency division of the non-pulsatory alternating voltage generated by the stable oscillator takes place.

What I claim is:

1. In a system for producing a control voltage whose value is a function of the frequency and phase difference existing between a first alternating voltage and a harmonic component of a second alternating voltage which is constituted by recurrent pulses, the fundamental frequency of said first voltage being high relative to the repetition rate of said second voltage, the combination comprising a mixing circuit, means to apply said first and second voltages as an input to said circuit, said circuit being normally blocked and being arranged to be rendered operative only for the duration of said pulses, and means to derive from the output of said circuit a control voltage which depends on the frequency and phase difference existing between said first voltage and a harmonic component of said second voltage.

2. In a system for producing a control voltage whose value is a function of the frequency and phase difference existing between a first alternating voltage and a harmonic component of a second alternating voltage which is constituted by recurrent pulses, the fundamental frequency of said first voltage being high relative to the repetition rate of said second voltage, the combination comprising a normally blocked mixing circuit including an electron discharge tube having a cathode, two grids and an anode, said first and second voltages being applied respectively to said two grids, means to render said mixing circuit operative only for the duration of the pulses applied to one of said grids, an integrating network connected to the anode and having a time constant exceeding the interval between successive pulses, and means to derive from said network a control voltage whose value is a function of the frequency and phase difference between said first voltage and a harmonic component of said second voltage.

3. In a system for producing a control voltage whose value is a function of the frequency and phase difference between a first alternating voltage and a second alternating voltage which is constituted by recurrent pulses, the fundamental frequency of said first voltage being high relative to the periodicity of said second voltage, the combination comprising a normally blocked mixing circuit including an electron discharge tube having a cathode, two grids and an anode, said first and second voltages being applied respectively to said two grids, said mixing circuit being arranged to be rendered operative only for the duration of said pulses applied to one of said grids, an integrating network connected to the anode and having a time constant exceeding the interval between successive pulses, whereby a control voltage is developed in the output of said network whose value is a function of the frequency and phase difference between said first voltage and a harmonic component of said second voltage, and a low-pass filter connected to the output of said network, said filter having a band pass characteristic discriminating against the frequency component of said control voltage equal to the periodicity of said pulses.

4. A system as set forth in claim 3 further including a peak detector interposed between said anode and said integrating network.

5. In a system for producing a control voltage whose value is a function of the frequency and phase difference existing between a first alternating voltage and a second alternating voltage which is constituted by recurrent pulses, the fundamental frequency of said first voltage being high relative to the periodicity of said second voltage, the combination comprising a normally blocked mixing circuit including an electron discharge tube having a cathode, two grids and an anode, said first and second voltages being impressed respectively on said two grids, said mixing circuit being arranged to be rendered operative only for the duration of the pulses, a diode peak detector having an anode capacitively coupled to the anode of said tube and a cathode connected to the cathode of said tube, a resistance-capacitance parallel network connected across said detector, said network having a time constant exceeding the interval between successive pulses, and means to derive a control voltage from the output of said network which depends on the frequency and phase difference between said voltage and a harmonic component of said second voltage.

6. In a system for producing a control voltage whose value is a function of the frequency and phase difference existing between a first alternating voltage and a second alternating voltage which is constituted by recurrent pulses, the fundamental frequency of said first voltage being high relative to the periodicity of said second voltage, the combination comprising a diode peak detector having a cathode and an anode, an inductive impedance having one end thereof connected to said cathode, a resistance connected between the other end of said impedance and said anode, a capacitor, means to apply the pulsed alternating voltage to said cathode, means to apply the other voltage through said capacitor to the anode, said capacitor and said resistance acting as an integrating network having a time constant exceeding the interval between successive pulses, and means to derive a control voltage from the output of said network which depends on the frequency and phase difference between said first voltage and a harmonic component of said second voltage.

7. In an arrangement for maintaining the frequency of an alternating voltage generator provided with a resonant circuit in synchronism with the most proximate harmonic of an alternating voltage constituted by recurrent pulses, the fundamental frequency of said generator being high relative to the repetition rate of said pulses, said arrangement comprising an electron discharge tube system coupled across said resonant circuit to vary the reactance thereof, the tube of said system including a cathode, a grid and an anode, said system further including a 90 degree phase-shifting network, a capacitor, said phase shifting network having one end connected to said anode and the other end connected through said capacitor to said grid, a resistor connected between said grid and cathode, and means for applying the pulsed alternating voltage through said capacitor to said grid to render said tube conductive for the duration of said pulses, said capacitor and resistor constituting an integrating network having a time constant exceeding the interval between successive pulses.

8. In an arrangement wherein an alternating voltage generator is maintained in synchronism with a harmonic component of an alternating voltage constituted by recurrent pulses, the fundamental frequency of said generator being high relative to the periodicity of said pulses, the combination comprising an electron-discharge tube having a cathode, a control grid, a screen grid, an additional grid and an anode, a resistance-capacitance series circuit connected between said anode and screen grid, a resonant tank circuit, means to apply a positive potential through said tank circuit to the junction of said series circuit, means to apply a positive potential to said anode, means inductively coupling said tank circuit to the control grid of said tube, a resistor connected between said cathode and said additional grid, a capacitor, and means to apply the recurrent pulse alternating voltage to said additional grid through said capacitor, said capacitor and said resistor constituting an integrating network having a time constant exceeding the interval between successive pulses.

9. In an arrangement provided with two sources of alternating voltage, one of said voltages being constituted by recurrent pulses, the frequency of the other voltage being high relative to the periodicity of said pulses, and a control device for adjusting the frequency of one of said sources, apparatus for maintaining a predetermined frequency relationship between the voltages of said sources comprising a normally blocked mixing circuit, means to impress said two voltages as an input to said circuit, said circuit being arranged to be rendered operative only for the duration of said pulses, means to derive a control voltage from said circuit whose value is a function of the frequency difference between a harmonic component of said pulses and the frequency of said other voltage, and means to apply said control voltage to said control device to effect the desired relationship.

10. In an arrangement provided with two sources of alternating voltage, one of said voltages being constituted by recurrent pulses, the frequency of the other voltages being high relative to the periodicity of said pulses, and a control device for adjusting the frequency and phase of one of said sources, apparatus for maintaining a predetermined frequency and phase relationship between the voltages of said sources comprising a normally blocked mixing circuit, means to impress said two voltages as an input to said circuit, said circuit being arranged to be rendered operative only for the duration of said pulses, integrating means to derive a control voltage from said circuit whose value is a function of the frequency and phase difference between a harmonic component of said pulses and the frequency of said other voltage, and means to apply said control voltage to said control device to effect the desired relationship.

11. In an arrangement provided with two sources of alternating voltage, one of said voltages being constituted by recurrent pulses, the frequency of the other voltage being high relative to the periodicity of said pulses, and a control device for adjusting the frequency of one of said sources, apparatus for maintaining a predetermined frequency relationship between the voltages of said sources comprising a normally blocked mixing circuit, means to impress said two voltages as an input to said circuit, said circuit being arranged to be rendered operative only for the duration of said pulses, an integrating network connected to the output of said circuit and having a time constant exceeding the interval between successive pulses whereby a control voltage is developed therein whose value is a function of the frequency difference between a harmonic component of said pulses and the frequency of said other voltage, and means to apply said control voltage to said control device to effect the desired relationship.

12. In an arrangement provided with two sources of alternating voltage, one of said voltages being constituted by recurrent pulses, the frequency of the other voltages being high relative to the periodicity of said pulses, and a control device for adjusting the frequency of one of said sources, apparatus for maintaining a predetermined frequency relationship between the voltages of said sources comprising a normally blocked mixing circuit, means to impress said two voltages as an input to said circuit, said circuit being arranged to be rendered operative only for the duration of said pulses, an integrating network connected to the output of said circuit and having a time constant exceeding the interval between successive pulses whereby a control voltage is developed therein whose value is a function of the frequency difference between a harmonic component of said pulses and the frequency of said other voltage, a low pass filter coupled to said network and arranged to suppress the pulse repetition component in said control voltage, and means to apply the control voltage to said control device to effect the desired relationship.

13. In an arrangement provided with two sources of alternating voltage, one of said voltages being constituted by recurrent pulses, the frequency of the other voltage being high relative to the periodicity of said pulses, and a control device for adjusting the frequency of one of said sources, apparatus for maintaining a predetermined frequency relationship between the voltages of said sources comprising a normally blocked mixing circuit, means to impress said two voltages as an input to said circuit, said circuit being arranged to be rendered operative only for the duration of said pulses, an integrating network connected to the output of said circuit and having a time constant exceeding the interval between successive pulses whereby a control voltage is developed therein whose value is a function of the frequency difference between a harmonic component of said pulses and the frequency of said other voltage, a low pass filter coupled to said network and arranged to suppress the pulse repetition component in said control voltage, and means to apply the control voltage to said control device to effect the desired relationship, said control device having a frequency control range which is smaller than the frequency distance between successive harmonics of the pulse repetition frequency.

14. In a system provided with two sources of alternating voltage, one of said voltages being constituted by recurrent pulses, the frequency of the other voltage being a multiple of the repetition frequency of said pulses, and a control device for adjusting the frequency of the source of said other voltage, apparatus for maintaining constant the frequency relationship of said sources comprising a normally blocked mixing circuit, means to impress said two voltages as an input to said circuit, said circuit being arranged to be rendered operative only for the duration of said pulses, integrating means to derive a control voltage from said circuit whose value is a function of the frequency difference between the frequency of said other voltage and a harmonic component of said pulses, and means to apply said control voltage to said control device to maintain said relationship between the two voltages.

15. In a system provided with a wave generator and a voltage-responsive frequency-control device coupled to said generator, apparatus for producing a control voltage to be supplied to said frequency control device to automatically govern the frequency of said generator with respect to a reference voltage constituted by recurrent pulses, the fundamental frequency of said wave being high relative to periodicity of said reference voltage, said apparatus comprising a normally blocked mixing circuit, means to apply said wave and said reference voltage as an input to said mixing circuit, means to render said mixing circuit operative solely for the duration of said pulses, each of said pulses having a duration which is small relative to one period of said wave, means to derive from the output of said mixing circuit a control voltage having a value depending on the frequency difference between said wave and a harmonic component of said reference voltage, and means to apply said control voltage to said frequency control device to govern the frequency of said generator accordingly.

16. In a system provided with a wave generator and a voltage-responsive frequency-control device having a predetermined operating range and coupled to said generator, apparatus for producing a control voltage to be supplied to said frequency-control device to govern automatically the frequency of said generator with respect to a reference voltage constituted by recurrent pulses, the fundamental frequency of said wave being high relative to the periodicity of said reference voltage, said apparatus comprising a normally blocked mixing circuit, means to apply said wave and said reference voltage as an input to said mixing circuit, means to render said mixing circuit operative solely for the duration of said pulses, each of said pulses having a duration which is small relative to one period of said wave, means to derive from the output of said mixing circuit a control voltage being a value depending on the frequency difference between said wave and a harmonic component of said reference voltage, and means to apply said control voltage to said frequency control device to govern the frequency of said generator accordingly, the control range of said frequency control device being smaller than the frequency distance between successive harmonic components of said reference voltage whereby the control of said device depends exclusively on the frequency difference between said wave and the most proximate component of said reference voltage.

17. An arrangement as set forth in claim 16 wherein said control voltage is applied to said frequency control device through a low pass filter substantially suppressing the frequency corresponding to the periodicity of said pulses.

EDUARD HERMAN HUGENHOLTZ.

REFERENCES CITED

The following references are of record in the file of this patent:

UNITED STATES PATENTS

| Number | Name | Date |
| --- | --- | --- |
| 1,871,741 | Rodwin | Aug. 16, 1932 |
| 2,058,411 | Carlson | Oct. 27, 1936 |
| 2,209,507 | Campbell | July 30, 1940 |
| 2,231,996 | Guanella | Feb. 18, 1941 |
| 2,261,286 | Rankin | Nov. 4, 1941 |
| 2,280,525 | Hunt | Apr. 21, 1942 |
| 2,312,079 | Crosby | Feb. 23, 1943 |
| 2,335,265 | Dodington | Nov. 30, 1943 |
| 2,343,263 | Okrent | Mar. 7, 1944 |
| 2,354,827 | Peterson | Aug. 1, 1944 |
| 2,396,688 | Crosby | Mar. 19, 1946 |
| 2,434,294 | Ginzton | Jan. 13, 1948 |
| 2,437,609 | Mayle | Mar. 9, 1948 |